Figure 1:
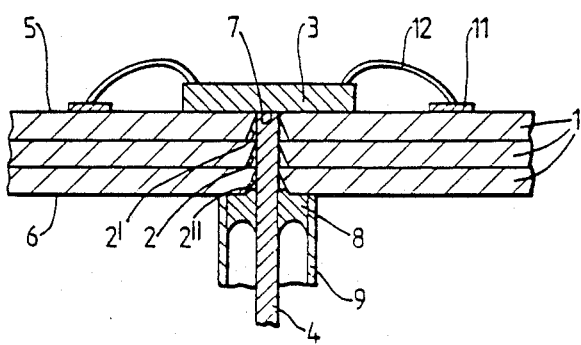

United States Patent [19]

Connell et al.

[11] Patent Number: 4,830,450

[45] Date of Patent: May 16, 1989

[54] OPTICAL FIBRE TERMINATION

[75] Inventors: Ian M. Connell, Cramlington; Brian M. MacDonald, Felixstowe; Christopher J. Stanghan, Ipswich, all of England

[73] Assignee: British Telecommunications public limited company, United Kingdom

[21] Appl. No.: 60,756

[22] PCT Filed: Sep. 8, 1986

[86] PCT No.: PCT/GB86/00531

§ 371 Date: May 8, 1987

§ 102(e) Date: May 8, 1987

[87] PCT Pub. No.: WO87/01465

PCT Pub. Date: Mar. 12, 1987

[30] Foreign Application Priority Data

Sep. 9, 1985 [GB] United Kingdom ................ 8522316

[51] Int. Cl.$^4$ .............................................. G02B 6/42
[52] U.S. Cl. .................................................. 350/96.2
[58] Field of Search ............................. 350/96.2, 96.21

[56] References Cited

U.S. PATENT DOCUMENTS 4,268,113  5/1981  Noel, Jr. ........................... 350/96.2
4,398,796  8/1983  Palgoutte et al. ................. 350/96.2

FOREIGN PATENT DOCUMENTS 021871  1/1981  European Pat. Off. .

OTHER PUBLICATIONS

Patents Abstracts of Japan, vol. 9, No. 101, (P353), (1824), 2 May 1985, & JP, A. 59226308, (Kiyoshi Hajikano), 19 Dec. 1984.
Patents Abstracts of Japan, vol. 6, No. 229(P-155, (1107), 16 Nov. 1982, & JP, A 57132110, (Fujitsu), 16 Aug. 1982.

Primary Examiner—John D. Lee
Assistant Examiner—John Ngo
Attorney, Agent, or Firm—Nixon & Vanderhye

[57] ABSTRACT

A termination for an optical fibre includes a planar support block which has an aperture there-through for receiving and accurately locating an optical fibre end. It is constructed out of a plurality of platelets, the aperture being provided by aligned, laser-drilled holes which are formed in each platelet. The holes, which are characteristically tapered, all taper in the same direction. They can therefore act as guides during insertion of a fibre end. Alternative arrangements are described. The termination is for use wherever an optical fibre must be accurately located relative to another component. If finds particular application as a support for a rear-entry photodiode.

14 Claims, 1 Drawing Sheet

U.S. Patent  May 16, 1989  4,830,450

OPTICAL FIBRE TERMINATION

The present invention relates to optical fiber terminations, and finds particular application in substrates for opto-electronic transducers.

It is often necessary that the end of an optical fiber be mounted so that it is aligned along a particular axis. For instance, if light is to be transferred between an optical fiber and another component such as a photodiode, the light transfer efficiency may be maximised by alignment of the optical fiber end along a particular axis in relation to the other component.

It is known to mount the end portion of an optical fiber in a termination comprising a block of ceramic material having an aperture therethrough. The wall of the aperture at least substantially aligns the fiber end portion along a known axis in the block of material.

Before being placed in the aperture, the fiber end portion is stripped down to the outermost surface of the glass cladding layer or layers. There are two reasons for this. Firstly, the fiber end portion can be aligned with much greater accuracy and, secondly, it can be much more effectively sealed at the aperture if the seal can be made directly to the glass cladding. This second feature is particularly useful where the aperture provides a path for the fiber end portion into an otherwise hermetically sealed optical package.

Because the aperture must be suitable to align a stripped fiber end, its diameter must be only slightly greater than the diameter of a stripped fiber. With fibers commonly having diameters of about 125 $\mu$m or 150 $\mu$m, significant manufacturing difficulties present themselves: it is not at all easy to construct an aperture accurately to a predetermined diameter when working at such small dimensions.

Two methods of constructing such an aperture are known. In a first method, the aperture is bored through a block of material in a single operation while in a second method, grooves are made in each of two half blocks of material then brought into register to form the aperture about the fiber end portion.

The first method suffers not only from the difficulty of making such a fine aperture but also from a risk of damage to the stripped fiber during its insertion into the bored aperture. A fiber end without its protective coverings is extremely sensitive to damage which can cause considerable light loss from the fiber in use. To compound the difficulty, the ceramic materials which can be most suitable for use in this context, for other reasons, tend to be extremely abrasive as well as being difficult to machine.

The second method largely avoids the possibility of damage to the stripped fiber end but still suffers from disadvantages. The accurate formation of two grooves of suitable dimensions and their being brought into register still present difficulties. Additionally, if the termination is to be used to couple an optical fiber to a photodiode, then problems arise in holding the two half blocks together. Two alternatives are to use epoxy resin or solder between the two half blocks. However, a particularly convenient arrangement is to mount the photodiode directly on the termination so that it overlies one end of the aperture. This means that it is difficult to avoid creating an interface between the resin or the solder and the photodiode. If epoxy resin is used to hold the half blocks together, contact between it and the photodiode can affect the material of the photodiode and consequently damage its action. If solder is used instead of epoxy resin, it can cause electrical difficulties such as earthing of the photodiode.

It is an object of the present invention to provide an improved optical fiber termination in which an end portion of an optical fiber may be mounted and accurately located, and a method of making the termination.

According to a first aspect of the present invention, there is provided a method of manufacturing an optical fiber termination, for receiving and locating an end portion of an optical fiber, which comprises the steps of:

(i) preparing a plurality of platelets of material, each platelet having a laser-drilled hole therethrough; and (ii) assembling the platelets into a layered structure, the holes being positioned so as to contribute to a common alignment aperture through the termination, and having nominally identical minimum diameters.

Methods according to the present invention allow the great dimensional accuracy with which laser-drilled holes can be constructed, even at sizes comparable to stripped optical fiber diameters, to be taken advantage of in locating a fiber end portion.

Conveniently step (ii) above may be carried out by inserting a common locating pin through the holes and arranging the platelets in relation to the locating pin.

According to a second aspect of the present invention there is provided an optical fiber termination, for receiving and locating an end portion of an optical fiber, comprising a plurality of platelets mounted in a fixed relationship to one another, each platelet having a laser-drilled hole therethrough, which holes have nominally identical minimum diameters and are positioned so as to contribute to a common alignment aperture through the termination, the alignment aperture providing location means adapted to receive, and to locate with respect to the termination, an optical fiber end portion.

To use a termination according to the present invention, an optical fiber end portion is inserted into the alignment aperture from one end. Laser-drilled holes are characteristically tapered. Preferably therefore, all the tapered holes open towards the end of the aperture via which a fiber end portion will be inserted. The taper of each hole is then particularly suited to provide guidance during insertion of the fiber end portion.

Embodiments of the invention find particular application a supports for opto-electronic components such as the so-called substrate entry photodiode. Discussion of these photodiodes may be found in an article by Lee et al. entitled "small area InGaAs/InP p-i-n photodiodes, Electronics Letters 1980 16 (4) pages 155-6.

A photodiode of this type comprises a small block which has a sensitive area on one face. In use, an optical fiber must be coupled to the sensitive area. To achieve that coupling, the photodiode is mounted with its face in contact with a support, an aperture being provided in the support through which the fiber can be optically coupled to the sensitive area.

A termination according to the present invention, for use as a support for an opto-electronic component, comprises a layered block of material, the platelets providing at least some of the layers. The alignment aperture opens into a face of the block which provides a site for mounting the opto-electronic component.

Figure 2:
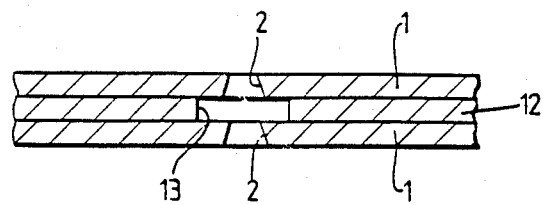

Supports for substrate entry photodiodes according to first and second embodiments of the present invention will now be described, by way of example only, with reference to the accompanying Figures in which:

FIG. 1 shows a cross section of a support according to a first embodiment of the invention, in use; and FIG. 2 shows a cross-section of a support according to a second embodiment of the invention, not in use.

Referring to FIG. 1, the support according to a first embodiment of the invention comprises three contiguous, platelets 1. Each platelet 1 is provided with a laser-drilled hole 2, all the holes 2 being aligned to provide an alignment aperture through the support. An optical fiber end 4 is mounted in the aperture so provided and a substrate entry photodiode 3 is mounted on the support, overlying the aperture. The fiber end 4 is optically coupled to the photodiode 3 via its sensitive area.

The platelets 1 of the support consist of 96°/o alumina and are each 635 $\mu$m thick. Because the holes 2 are laser-drilled, each one is conical. This is due to the fact that during a single drilling operation the rise in temperature produced by the beam in the material of the platelets 1 has more time to propogate through the material, away from the beam, where the beam is in close proximity to it for the longest. Hence the beam has the greatest effect, in terms of material removed, at the face of the platelet 1 where the beam first impinges. As material at increasing depth through the platelet 1 is considered, the total time for which the beam will be in close proximity to it decreases since the beam takes time to penetrate through the platelet. Hence a decreasing amount of material will be removed and the laser-drilled hole 2 produced will be generally conical.

The smallest diameter of each hole 2 is 152 $\mu$m and it is this dimension at the small end of each hole 2 which acts to locate the optical fiber end 4 in the support. The largest diameter is 254 $\mu$m.

A first face 5 of the support provides a mounting site for the photodiode 3 such that the photodiode 3 lies over the smaller end of an hole 2'. The optical fiber lies in abutment or near abutment with the photodiode 3 to provide the optical coupling therewith.

Although lying loose through the aperture provided by the holes 2, the fiber end 4 is attached to a second face 6 of the support which is remote from the photodiode 3. In order to lend added support to the fiber end 4 at the attachment point, and to minimise damage to the fiber by bending, a coaxial support tube 9 is provided. The tube 9 is a brass tube, being 8 mm long and of internal and external diameters 0.43 mm and 0.61 mm respectively. The tube 9 abuts the second face 6 of the support, around the margin of the hole 2" opening into that face. Both the fiber end 4 and the tube 9 are attached to the support by means of solder 8 which provides a seal between the outer surface of the fiber end 4, the margin of the relevant aperture 2", and the internal surface of the tube 9.

The fiber end 4 is thus unattached within the alignment aperture but located in position by the combined effect of the minimum diameters of the holes 2. These minimum diameters provide location of the fiber end 4 at three positions spaced along the fiber end 4 at intervals of 635 $\mu$m.

Electrical connections 12 are made of the photodiode 3 by means of contact pads 11 on the first face 5 of the support.

In order to manufacture the support described above, firstly the three platelets 1 are prepared. Each platelet 1 has a hole 2 laser-drilled individually therethrough. The manner in which the holes 2 may be laser-drilled will be known to a person skilled in the art and is not therefore further described.

In order to provide suitable surfaces for the soldering of the fiber end 4 and the tube 9 to the completed support, the fiber end 4, the internal surface of the tube 9, and the surface of one of the platelets 1 which is to become the second face 6 of the support are all metallised in the region where the solder 8 is to provide a seal. Metallisation on the surface of the platelet 1 is in the form of an annulus which extends around the opening of its respective hole 2". A length of about 0.5 mm of the fiber end 4, adjacent its end face, is left unmetallised in order to keep stray capacitance levels low in use of the completed support.

In order to facilitate the soldering of the photodiode 3 to the completed support, the surface of a second of the platelets 1, which is to become the first face 5 of the support, is also metallised. Metallisation is applied to that part of this second platelet 1 which will provide the mounting side for the photodiode 3.

The contact pads 11 are conveniently deposited in the same operation as the metallisation.

To assemble the layers 1 into the layered structure of the support, they are stacked together and fired with a thick film dielectric ink between adjacent faces. The ink, once fired, maintains the stacked structure. In order to ensure that the holes 2 of the platelets 1 are aligned as stacking takes place, a piece of wire is inserted into the holes 2 and only withdrawn when the platelets 1 and ink have been fired.

To mount the fiber end 4 in the alignment aperture provided by the holes 2, it is fed in from the second face 6 of the support. In this way, it is guided into each hole 2 by its tapered nature.

Before the fiber end 4 is mounted in the hole, the support tube 9 is threaded onto it and held to one side so that it can later be brought into its supporting position. When the fiber end 4 is in position in the aperture, it is fixed there by means of an annulus of solder. The solder is applied to encircle the metallised fiber end 4 and to seal it to the annulus of metallisation on the first face 5 of the support. The tube 9 is then moved into position abutting the support and the solder is reheated so that it flows against the internal, metallised surface of the tube 9, sealing it also to the annulus of metallisation on the support.

To mount the photodiode 3, it is placed on the mounting site provided by the first face 5 of the support with the fiber end 4 being previously fixed in place in the aperture. Light is passed along the fiber end 4 so that the degree of optical coupling between it and the photodiode 3 can be monitored, so allowing the photodiode 3 to be manoeuvred until maximum coupling is achieved. The photodiode 3 is then soldered into the position where such coupling has been achieved.

It may not be necessary that the third platelet 1 be provided. In feeding the fiber end 4 into the aperture, little guidance may be required at the third of the holes 2 since the fiber end 4 will be aligned by the first two. Consequently, However, there are constraints other than that of accurate alignment which make it preferable that there should be three platelets 1 or even more.

One of these constraints is the stray capacitance present in the arrangement, in use. It is preferable to maintain such stray capacitance at as low a level as practicable, during use, because of its deleterious effect on the function of the photodiode 3. One factor which can affect the stray capacitance is the proximity of the solder 8 to the photodiode 3 and its electrical contacts 11. By using at least three platelets 1 in the support, the solder 8 can be substantially retained at a distance of at least two platelets' thickness from the photodiode 3 and contacts 11.

Using a support as described above, with reference to FIG. 1, wherein the layers 1 are constructed out of 96%/o alumina, stray capacitance levels of about 0.06 pF have been observed, excluding the photodiode capacitance. In a variation, the alumina was replaced by steatite, stray capacitance levels of about 0.03 pF then being observed.

Referring to FIG. 2, an alternative construction uses only two platelets 1 having a laser-drilled hole 2 therethrough, and á third, intervening layer 12 having a comparatively large hole 13 therethrough, made by any convenient means. This construction offers slightly lower stray capacitances, 0.025 pF having been observed using platelets and a layer constructed out of steatite, but is slightly more complicated to manufacture.

A support such as that described above, by offering a hermetically sealed mounting for the optical fiber end 4, is suitable for being incorporated into the wall of an optical device package.

The accuracy with which an optical fiber end can be located along a preselected axis in a termination according to the present invention will be determined in part by the relationship between the size of the laser-drilled holes and the outer diameter of the fiber end, and in part by the degree of alignment of the holes. The accuracy in locating an optical fiber end that is required, however, is determined by the spatial tolerance of the optical coupling that is to be made with the fiber end. Typically the core diameter of a monomode optical fiber is 8 μm. If the fiber is to be coupled to a photodiode having a sensitive area of for instance 40 μm diameter, the accuracy required is likely to be relatively low. If, however, it is to be coupled to a photodiode having a smaller sensitive area, or to a different type of component with a relatively small coupling area, then clearly the accuracy required will be higher.

Although the support for rear-entry photodiodes described above comprises platelets which are 635 μm thick, the thickness of the platelets may clearly be varied. The depth of the platelet, and the material from which it is constructed, will both have an effect on the dimensions of the laser-drilled hole in that platelet. Therefore the nature of the hole required may at least partially determine the depth of the platelets used and the material they consist of.

Optical fibers for different purposes can vary considerably in outer diameter, typical examples including fibers of outer diameters 250 μm and 125 μm. Hence the minimum diameter of a relevant laser-drilled hole in one case may be required to be of up to and including 300 μm diameter, and in another case may be required to be of up to and including 160 μm.

We claim:

1. A method of manufacturing an optical fiber termination, for receiving and locating an end portion of an optical fiber, which comprises the steps of:
    (i) preparing a plurality of platelets of material, each platelet having a laser-drilled hole therethrough, each hole being of a substantially frusto-conical shape tapering from a minimum diameter to a maximum cross-sectional diameter; and
    (ii) assembling the platelets into a layered structure, the holes being positioned so as to taper in a common direction and to contribute to a common alignment aperture.

2. A method according to claim 1 wherein step (ii) is carried out by means of inserting a common locating pin through the laser-drilled holes and arranging the platelets in relation to the locating pin.

3. An optical fiber termination, for receiving and locating an end portion of an optical fiber, comprising:
    a plurality of platelets mounted in a fixed relationship to one another,
    each platelet having a laser-drilled hole therethrough, which holes are of a substantially frusto-conical shape tapering in a common direction from a minimum diameter to a maximum cross-sectional diameter and have nominally identical minimum cross-sectional diameters and are positioned so that the holes contribute to a common alignment aperture through the termination.

4. A termination, according to claim 3, wherein the termination comprises three platelets, the platelets being contiguous with one another.

5. A termination, according to claim 3, wherein the termination comprises two platelets, the platelets being spaced apart.

6. A termination, according to claim 5, wherein the two platelets are spaced apart by means of an intervening layer, the intervening layer having a hole therethrough adapted to allow the reception and location of an optical fiber end portion by the alignment aperture.

7. A termination according to claim 3 wherein the platelets are constructed out of a ceramic material.

8. A termination according to claim 3 wherein each platelet is less than or equal to 650 μm thick.

9. A termination according to claim 3 wherein the minimum cross-sectional diameter of each laser-drilled hole is less than or equal to 300 μm.

10. A termination according to claim 9 wherein said minimum cross-sectional diameter is less than or equal to 160 μm.

11. A termination according to claim 3 wherein a face of the termination provides a mounting site for an opto-electronic transducer, the site being such that an opto-electronic transducer mounted on the site is capable of being optically coupled to an optical fiber end portion received and located in the alignment aperture.

12. A termination according to claim 11 having an optical fiber end portion received and located therein, the optical fiber end portion being secured and hermetically sealed to the termination by means of an annulus of fixing material which extends between the optical fiber end portion and a face of the termination wherein the fixing material is solder and the face of the termination to which the fixing material extends is parallel and opposed to the face which provides a mounting site.

13. An optical assembly comprising a termination according to claim 11, an optical fiber end portion received in the alignment aperture, being secured to the termination, and an opto-electronic transducer mounted on the mounting site, the transducer being optically coupled to the optical fiber.

14. A termination according to claim 3 having an optical fiber end portion received and located therein, the optical fiber end portion being secured and hermetically sealed to the termination by means of an annulus of fixing material which extends between the optical fiber end portion and a face of the termination.

* * * * *

UNITED STATES PATENT AND TRADEMARK OFFICE
CERTIFICATE OF CORRECTION

PATENT NO. : 4,830,450

DATED : 16 May 1989

INVENTOR(S) : Ian M. Connell et al

It is certified that error appears in the above-identified patent and that said Letters Patent is hereby corrected as shown below:

In the Abstract: line 11, "If" should read --It--.
In the Application:
Column 2, line 47, "a supports" should read --as supports--;
        line 50, "small" should read --Small-- and "photodiodes,"
should read --photodiodes.

Column 3, line 14, "96   " should read --96%--;
        line 19, "propogate" should read --propagate--;
        line 60, "of" should read --to--.

Column 4, line 58, "However" should read --however--.

Column 5, line 6, "96%" should read --96%.

Signed and Sealed this

Twenty-ninth Day of May, 1990

Attest:

HARRY F. MANBECK, JR.

*Attesting Officer*      *Commissioner of Patents and Trademarks*